United States Patent

Hobson

[11] Patent Number: 5,480,607
[45] Date of Patent: Jan. 2, 1996

[54] METHOD AND APPARATUS FOR MOLDING PLASTIC PRODUCTS WITH FLASH REMOVED

[76] Inventor: Gerald R. Hobson, 21721 Walnut St., Shell Rock, Iowa 50670

[21] Appl. No.: 214,827

[22] Filed: Mar. 16, 1994

Related U.S. Application Data

[63] Continuation-in-part of Ser. No. 35,300, Mar. 22, 1993, abandoned.

[51] Int. Cl.$^6$ ............................. B29C 37/02; B29C 49/50
[52] U.S. Cl. .......................... 264/536; 264/161; 264/334; 425/289; 425/444; 425/531; 425/806
[58] Field of Search ...................... 264/161, 536, 264/334; 425/289, 531, 533, 806, 806 R, 806 A, 436 R, 436 RN, 444

[56] References Cited

U.S. PATENT DOCUMENTS

| | | | |
|---|---|---|---|
| 2,541,249 | 2/1951 | Hobson | 425/531 |
| 2,994,921 | 8/1961 | Hultgren | 425/806 R |
| 3,004,291 | 10/1961 | Schad | 425/806 R |
| 3,013,303 | 12/1961 | Amazon | 264/161 |
| 3,592,887 | 7/1971 | Edwards | 264/161 |
| 3,593,374 | 7/1971 | Siero | 425/806 |
| 3,632,262 | 1/1972 | Johnston | 425/289 |
| 4,076,478 | 2/1978 | Rossio | 425/218 |
| 4,548,574 | 10/1985 | Badalamenti | 425/806 |
| 4,647,275 | 3/1987 | Lundquist | 264/161 |
| 4,820,467 | 4/1989 | Ehrler | 264/334 |

FOREIGN PATENT DOCUMENTS

| | | | |
|---|---|---|---|
| 1112281 | 8/1961 | Germany | 264/161 |
| 46-22875 | 6/1971 | Japan | 264/161 |

Primary Examiner—Jay H. Wco
Assistant Examiner—Duane S. Smith
Attorney, Agent, or Firm—Henderson & Sturm

[57] ABSTRACT

The present invention teaches an improved method and apparatus for molding plastic products which results in the removal of plastic residue such as flash from the products during the molding process itself. The invention teaches the use of flash retainers, situated within the mold, and into which a portion of the plastic flash becomes trapped during the molding process. After the mold is opened, the product is removed, leaving the flash still secured to the mold. The flash is then removed from the mold by the use of ejector rods which are inserted to within the flash retainers, forcing the flash from the retainer and thereby releasing the flash from the mold. In one embodiment, the flash is pinched between two members which are moved simultaneously away from the molded product to tear the flash completely away from the outer periphery of the molded product.

19 Claims, 9 Drawing Sheets

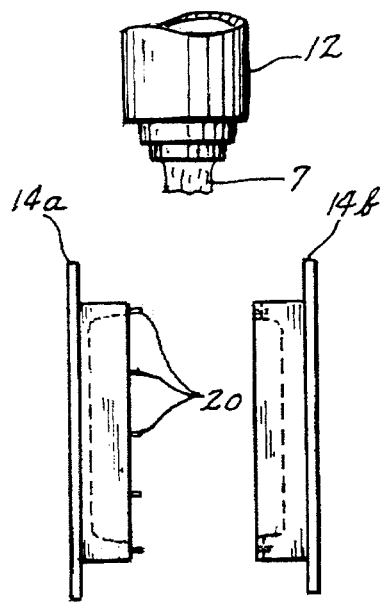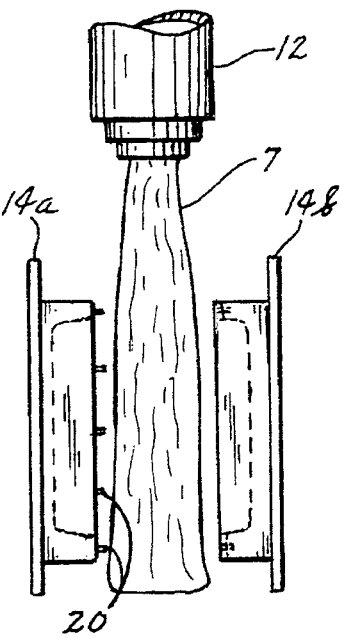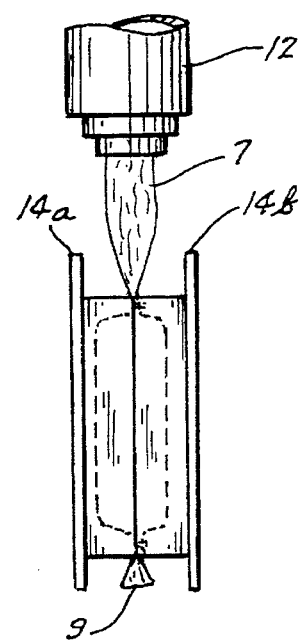
Fig. 1  Fig. 2  Fig. 3
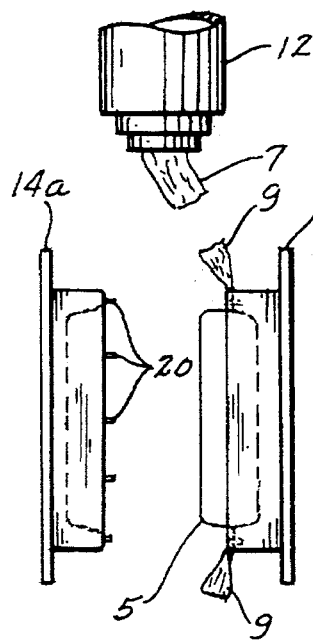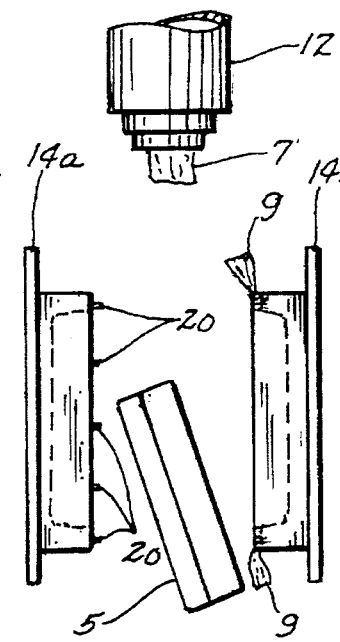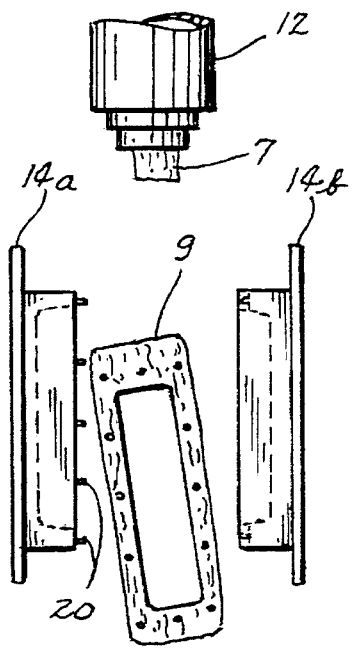
Fig. 4  Fig. 5  Fig. 6

METHOD AND APPARATUS FOR MOLDING PLASTIC PRODUCTS WITH FLASH REMOVED

CROSS-REFERENCE TO RELATED APPLICATIONS

This application is a continuation-in-part of U.S. patent application Ser. No. 08/035,300 filed Mar. 22, 1993 now abandoned.

TECHNICAL FIELD

This invention relates to the field of plastics molding, and more particularly to a method and apparatus for molding plastic in which flash may be removed from the plastic product during the molding process.

BACKGROUND ART

Conventional plastic molding systems often produce a residue, called flash, which is extruded between the mold sections during the molding process and then must be removed from the plastic product. The removal of flash is typically done manually, and is a very labor intensive task, which of course results in higher production costs for the product. Also, many cases of Carpal Tunnel Syndrome have developed from the repetitive trimming of molded plastic parts, resulting in lost work and expensive Workmans' Compensation claims.

DISCLOSURE OF THE INVENTION

The present invention teaches an improved method and apparatus for molding plastic products which results in the removal of flash from the products during the molding process itself. The invention teaches that the flash may be secured to a mold section during the molding process by means of retainers situated within the mold and into which the plastic flash is forced while in a fluid state. The flash is then retained upon that mold section when the mold is opened and is detached from the product when the product is retained within the opposite mold section or as the product is ejected from the mold. The flash is then removed from the mold by means of ejector pins which are inserted to within the retainers, forcing the flash from the retainers and thereby freeing the flash from the mold.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 through FIG. 6 depict side elevation views of a representative blow molding operation utilizing the teachings of the present invention;

BEST MODES FOR CARRYING OUT THE INVENTION

Figure 7:
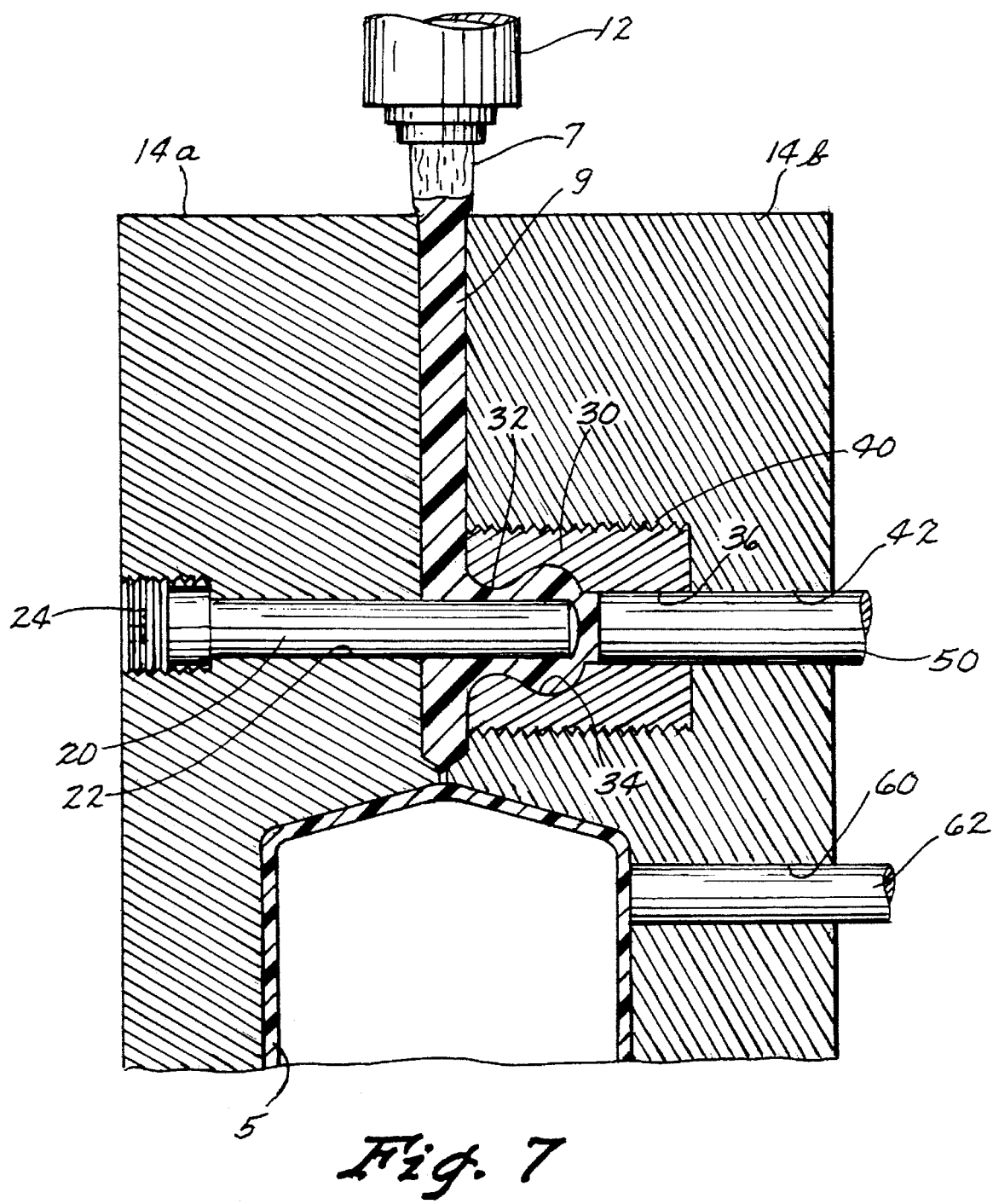
FIG. 7 through FIG. 9 depict partial cross-sectional views of a representative blow molding operation utilizing the teachings of the present invention.

Referring now to the drawings, wherein like reference numerals designate identical or corresponding parts throughout the several views, FIG. 1 through FIG. 6 depict a representative blow molding operation with an extruder 12 positioned above a mold 14. The mold 14 is initially in the open position (FIG. 1), at which time a parison 7 is extruded to a position between the mold sections 14a, 14b (FIG. 2). The mold sections 14a, 14b then close upon the parison and the mold is blown to expand the parison upon the internal surface of the mold (FIG. 3). After the plastic has hardened sufficiently, the mold is opened (FIG. 4) and the product 5 is ejected from the mold section 14b within which it has been retained (FIG. 5), at the same time separating the product 5 from the flash 9 which is retained upon that mold section 14b. Finally, the flash 9 is ejected from the mold section 14b and the mold is ready to repeat the molding operation. FIG. 7 is an enlarged depiction of the mold 14 after it has closed upon the parison 7 (as depicted in FIG. 3), but more clearly shows the present invention. A plurality of flash pins, 20 are mounted in one of the mold sections 14a such that they protrude from the mold face a sufficient distance so as to engage a like number of flash retainers 30 mounted in the opposite mold section 14b. The flash pins 20 are fitted to within apertures 22 formed into the mold section 14a, and are held in place with set screws 24 threaded into the outer portion of the aperture 22. The flash pins 20 have an enlarged head so that they will be firmly held in place within the mold section 14a when the set screws 24 are screwed into place. The number of flash pins is of course a function of the size of the mold and of the type of plastic being molded. The pins would typically be spaced at approximately two inch intervals around the edge of the mold.

Figure 9:
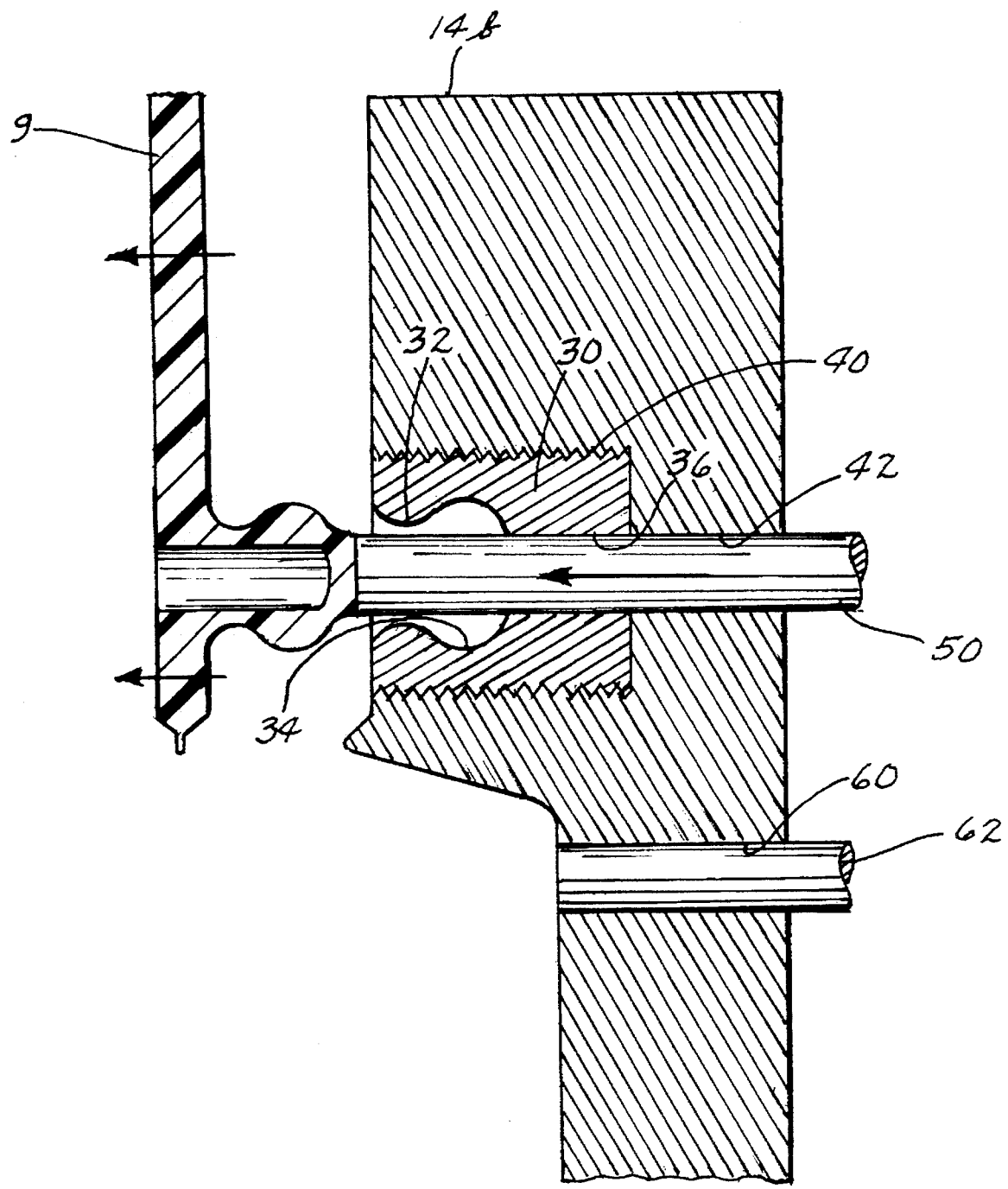

The flash retainers 30 are cylindrical (but can also be other shapes), housings which are secured into the face of a mold section 14b so as to receive a flash pin 20 from the opposing mold section 14a when the mold is closed. The flash retainers 30 have a hollow core with a curved inlet 32, an internal chamber 34, and a cylindrical aperture 36. The diameter of the throat of inlet 32 must be somewhat larger than the diameter of flash pin 20, preferably approximately 1.2 times the flash pin diameter. The diameter of the chamber 34 at its largest point must be somewhat larger than the inlet throat diameter, preferably 1.5 times the diameter of the flash pin 20. This configuration allows flash to be forced by the flash pin 20 to within the flash retainer 30 where, due to the larger diameter of the chamber 34, the flash is held after the flash pin 20 is withdrawn as the mold is opened. The mold section 14b has threaded apertures 40 for receiving the flash retainers 30, and unthreaded apertures 42, coaxial with the threaded apertures 40, through which slide flash ejector rods 50. The flash ejector rods 50 are slidably mounted within the unthreaded apertures 42 and serve to force the flash from within the chamber 34 and inlet 32, thereby releasing the flash from the face of the mold section 14b (FIG. 6 and 9).

Figure 8:
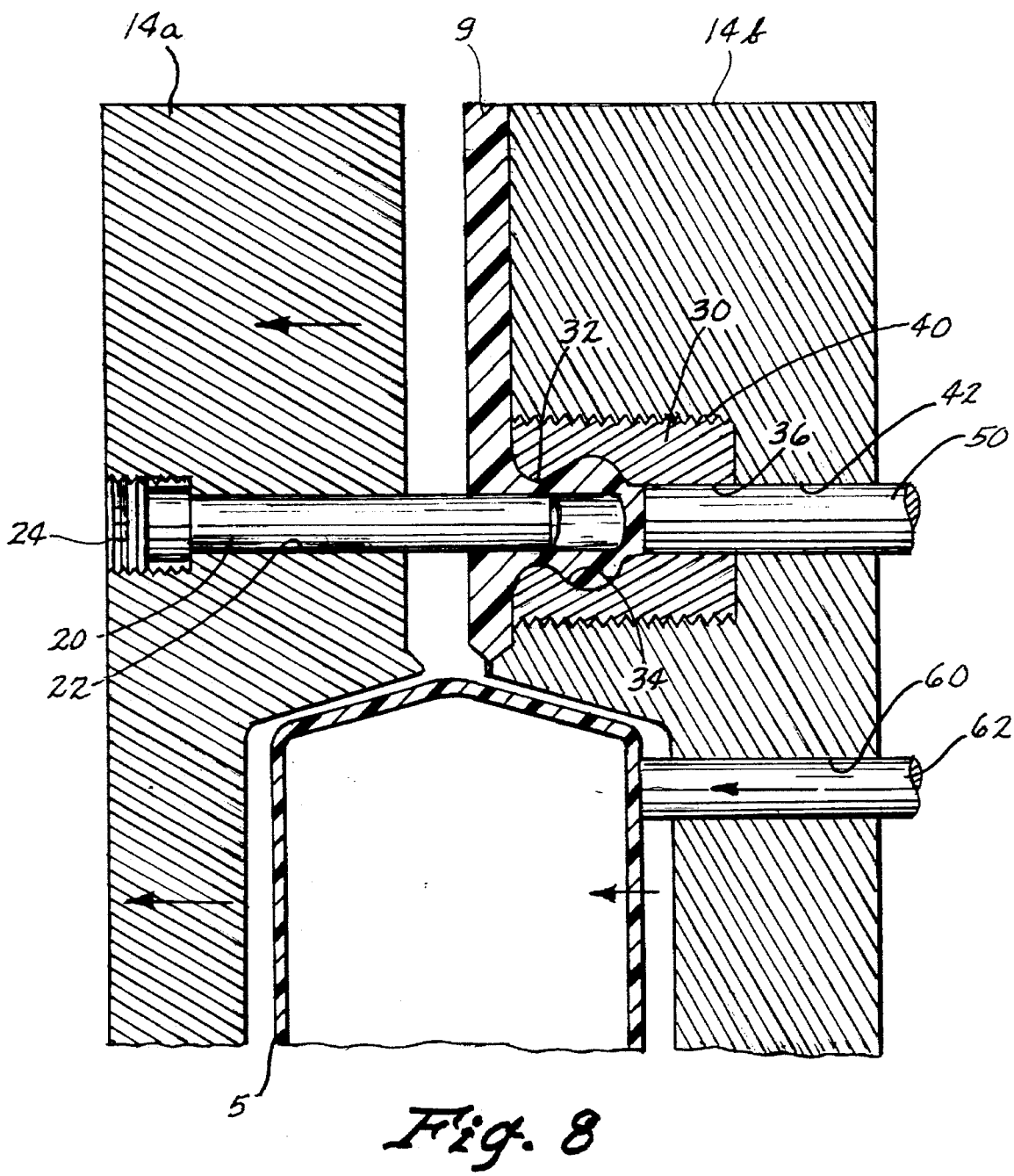

The mold section 14b upon which the flash is retained is also fitted with an aperture 60 leading into the molding compartment of the mold into which is slidably mounted a product ejection rod 62. After the mold is opened, the product ejection rod 62 is extended through aperture 60 so as to eject the plastic product from the mold section 14b (FIGS. 5 and 8).

The present invention is therefore intended to function as follows. A parison 7 is extruded between a pair of mold sections 14a, 14b, which then close upon the parison. As the mold closes, a series of flash pins 20 drive the plastic residue, deposited on the edges of the mold, to within the flash retainers After the plastic has hardened sufficiently, the mold is opened, thereby withdrawing the flash pins 20 from the flash retainers 30. As the mold is opened, or shortly thereafter, the product 5 is ejected from the mold section 14b by the action of product ejection rod 62. This action also tears the product 5 from the flash 9. Finally, the flash itself is removed from mold section 14b by the action of flash ejector rods as they slide within the flash retainers 30 and force the flash from the mold.

Figure 10:
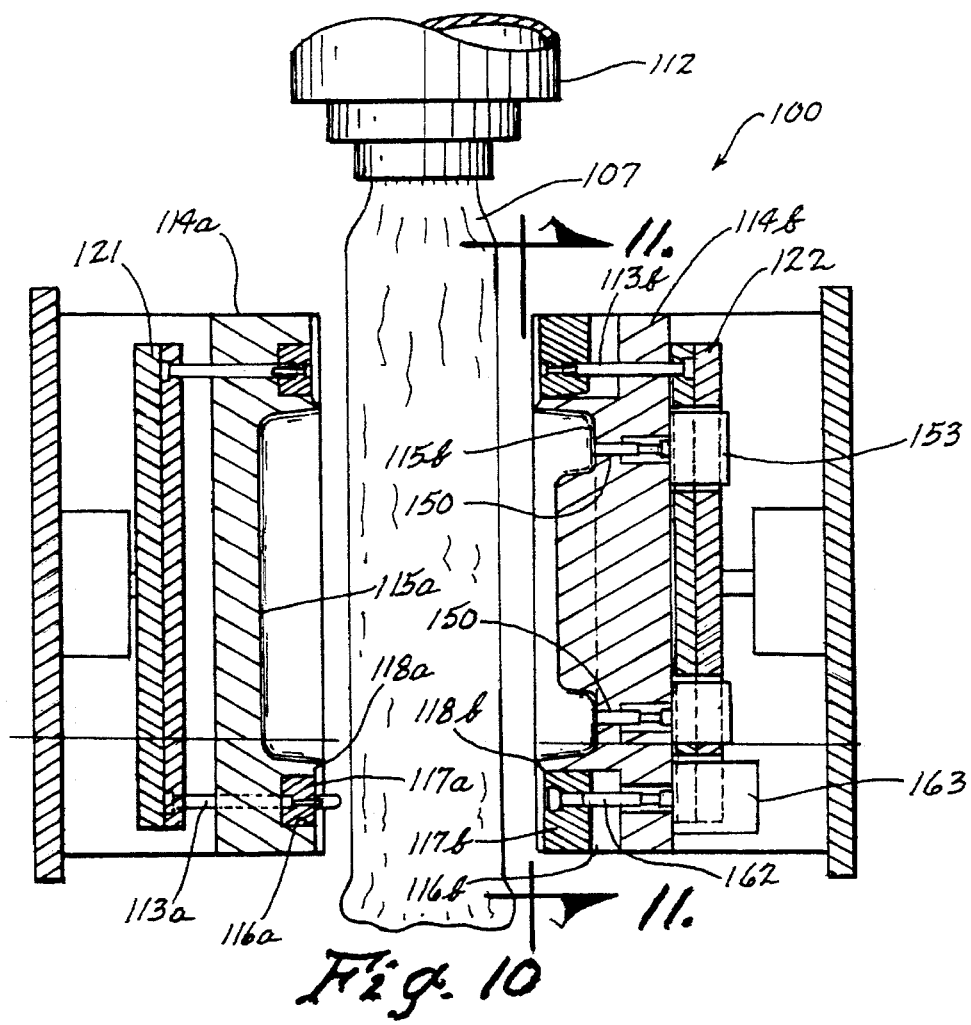
FIG. 10 shows another embodiment of the present invention shown with the parison dropping down between the two mold halves.

Referring to FIG. 10, a mold set up 100 has a first mold section 14a and a second mold section 14b. A cavity 115a is disposed in one mold section 14a and second mold cavity 115b is disposed in the cavity in the mold section 14b. A retainer recess 116a and 116b are disposed in mold half sections 14a and respectively. A first member 117a is disposed in the mold cavity 116a and a second member 117b is disposed in the other cavity 116b.

Pins 113a are connected by a member 121 so that when member 121 is moved to the right as shown in FIG. 10, the member 117 will be moved to the right and vice versa. Similarly, when member 113b and its associated connecting structure 122 is moved to the left, member 117b moves to the left, and vice versa.

Figure 11:
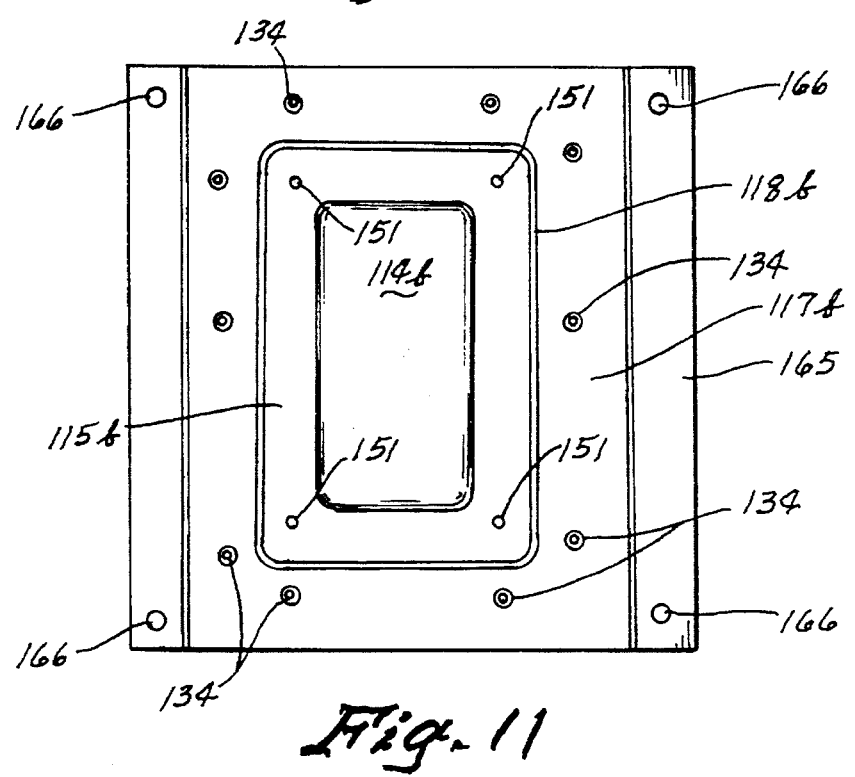
FIG. 11 is a view taken along line 11—11 of FIG. 10.

Ejector pins 162 are moved by actuators 163 and ejector pins 150 are moved by ejector actuator 153. Internal chambers 134 in the flashing plate 117 are for the same purpose as recesses 34 in the aforementioned embodiment. Ejector pins 151 are shown in FIG. 11, along with a pinch-off section 118b, a crash pad 165 and a leader pin 166.

Figure 12:
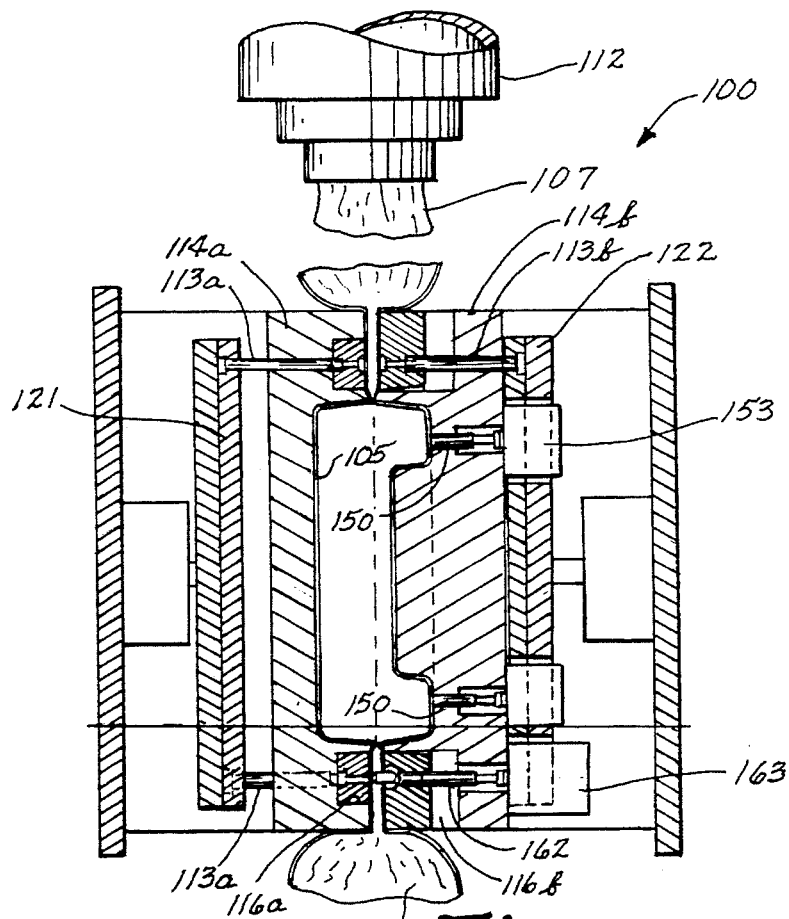
FIG. 12 is a cross sectional view like FIG. 10, but showing the mold halves closed to blow mold a product.

In operation, the nozzle 112 is operated to allow a plastic parison 107 to drop down between the mold sections 114a and 114b. The mold sections are then closed to the position shown in FIG. 12 whereupon air is blown inside of the plastic part member 105 as is conventional in this art. The lower part of the parison 107 is shown as flash portion 109 in FIG. 12.

Figure 13:
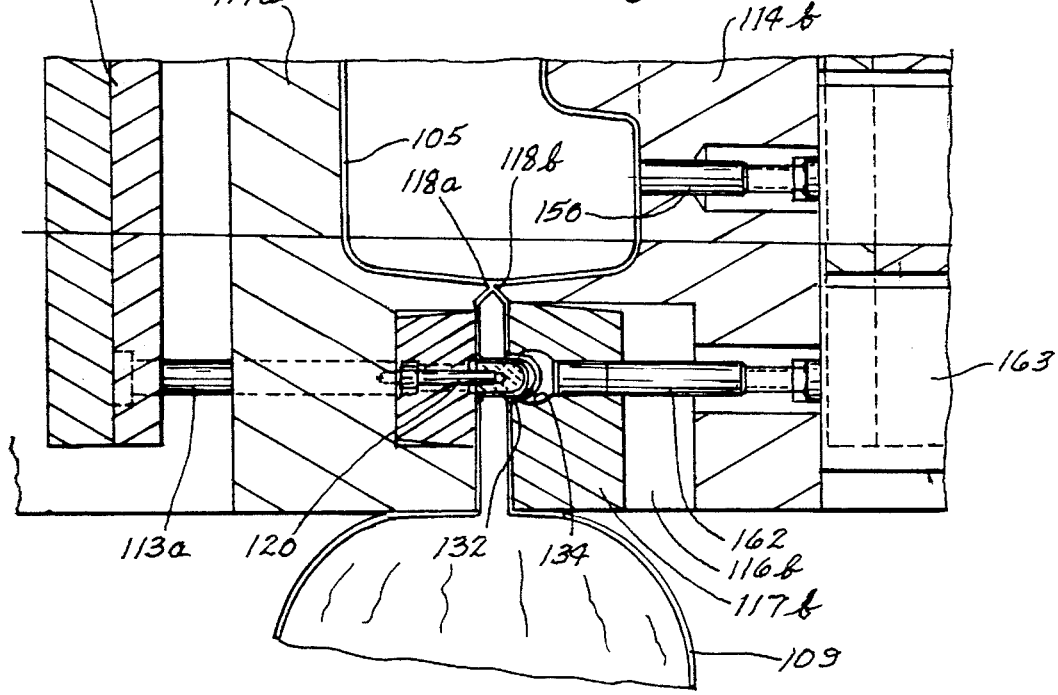
FIG. 13 is an enlarged cross sectional view of the lower part of FIG. 12.
Figure 14:
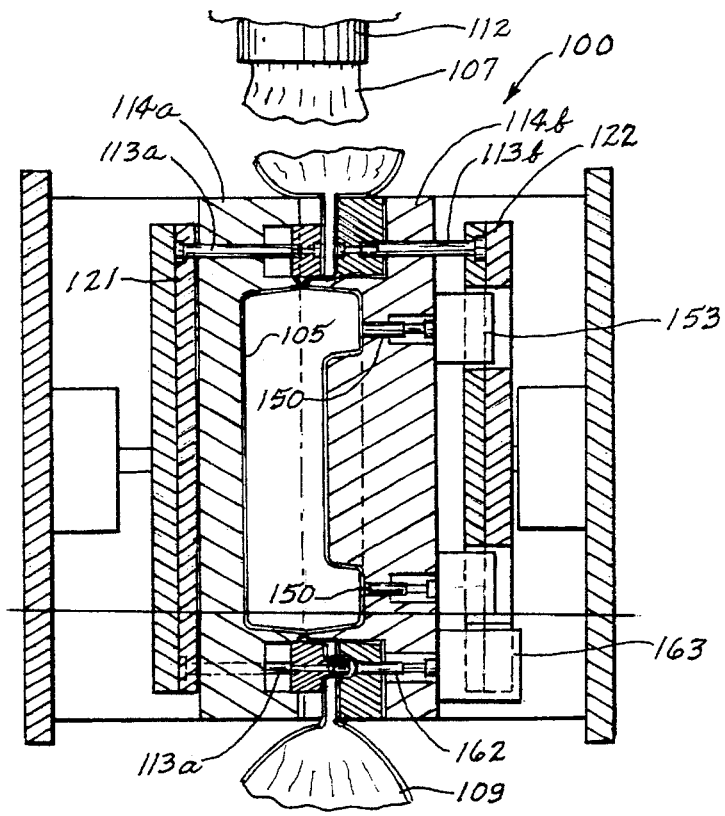
FIG. 14 is a cross sectional view like FIG. 10, but showing how the flash is removed around the exterior periphery of the plastic product formed.

Referring to FIG. 13, it is noted that a member 120 pushes part of the flash 132 into the enlarged opening 134 in member 117b. Consequently, the flash portion will be attached to member 117b in the manner that the flash is retained in chamber 34 in the aforementioned embodiment. After the FIG. 12 and 13 position of the mold parts, the flash is then removed by actuating or moving the member 121 from the position shown in FIG. 12 to the position shown in FIG. 14, which moves members 117a and 17b to the right as shown in FIG. 14. This tears the flash off of the outside of the part 105 completely on the outer periphery of the part 105.

Figure 15:
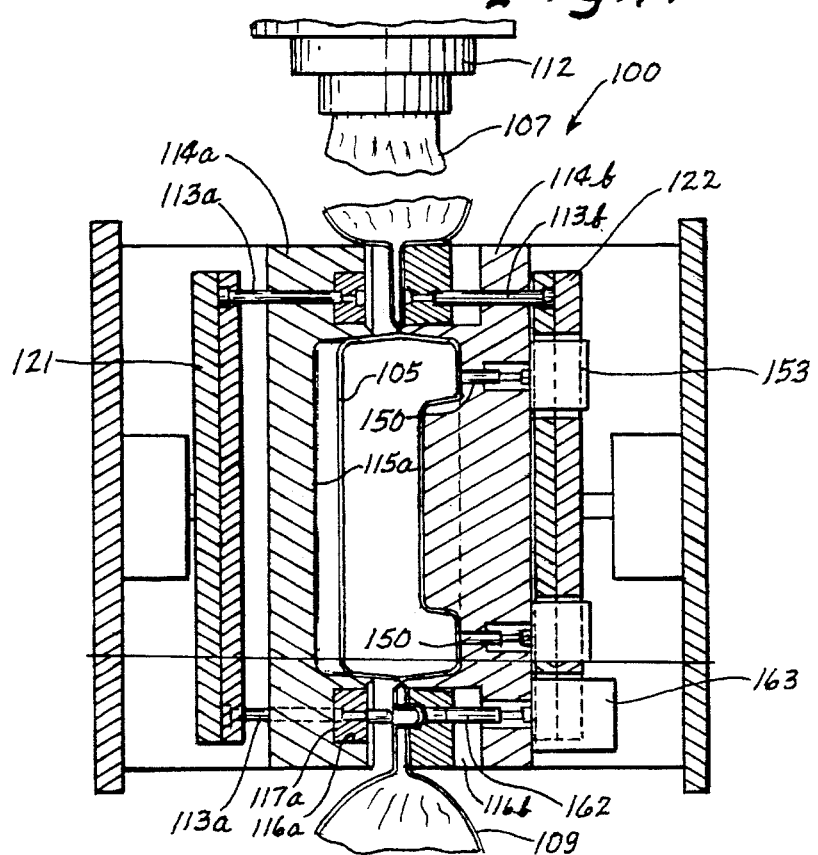
FIG. 15 is a cross sectional view like FIG. 10, but showing the mold starting to open again after the flash has been separated from the molded product.

The next step of the process is shown in FIG. 15 wherein the mold halves begin to open and although the flash is shown back in the position where it was torn off of the part 105, it is completely severed therefrom in the FIG. 15 position of the mold parts.

Figure 16:
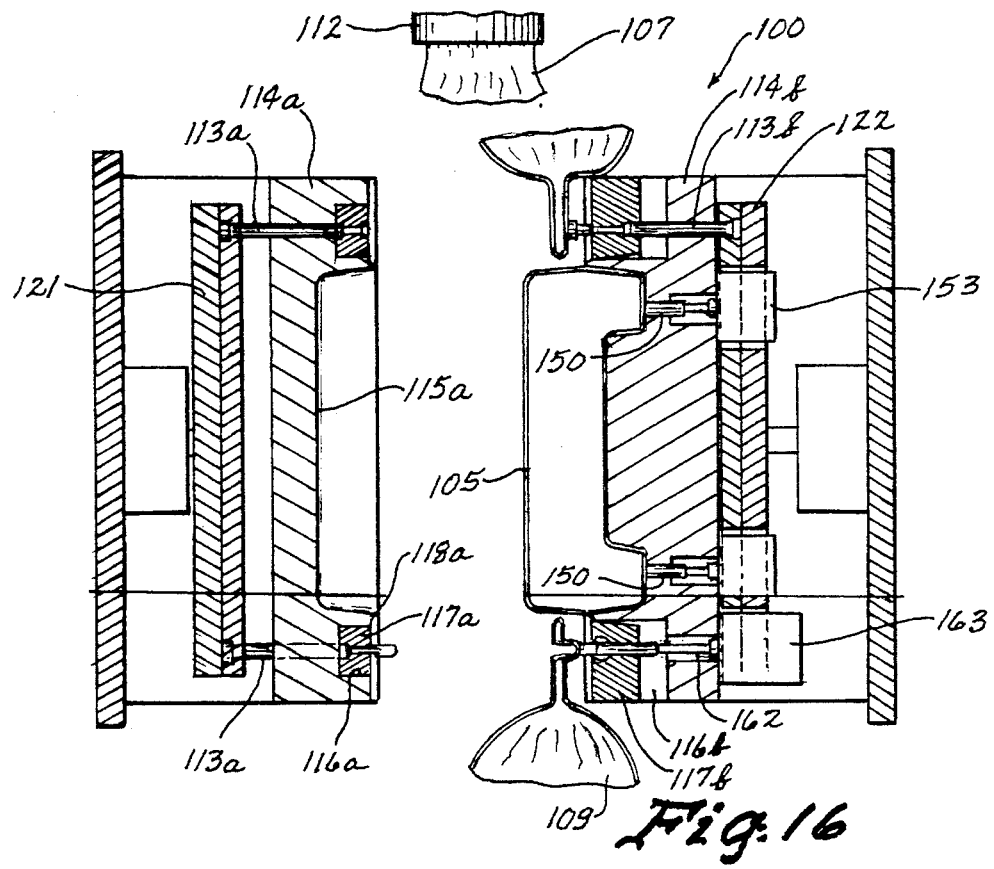
FIG. 16 is a view like FIG. 10, but showing the mold opened and the flash being ejected.

The next step of the process is shown in FIG. 16 wherein the mold is completely open and the pins 162 are actuated by actuators 163 to move from right to left to push the flash 109 out of the retainer openings 134 so that the flash can then drop down on a conveyor belt or the like.

Figure 17:
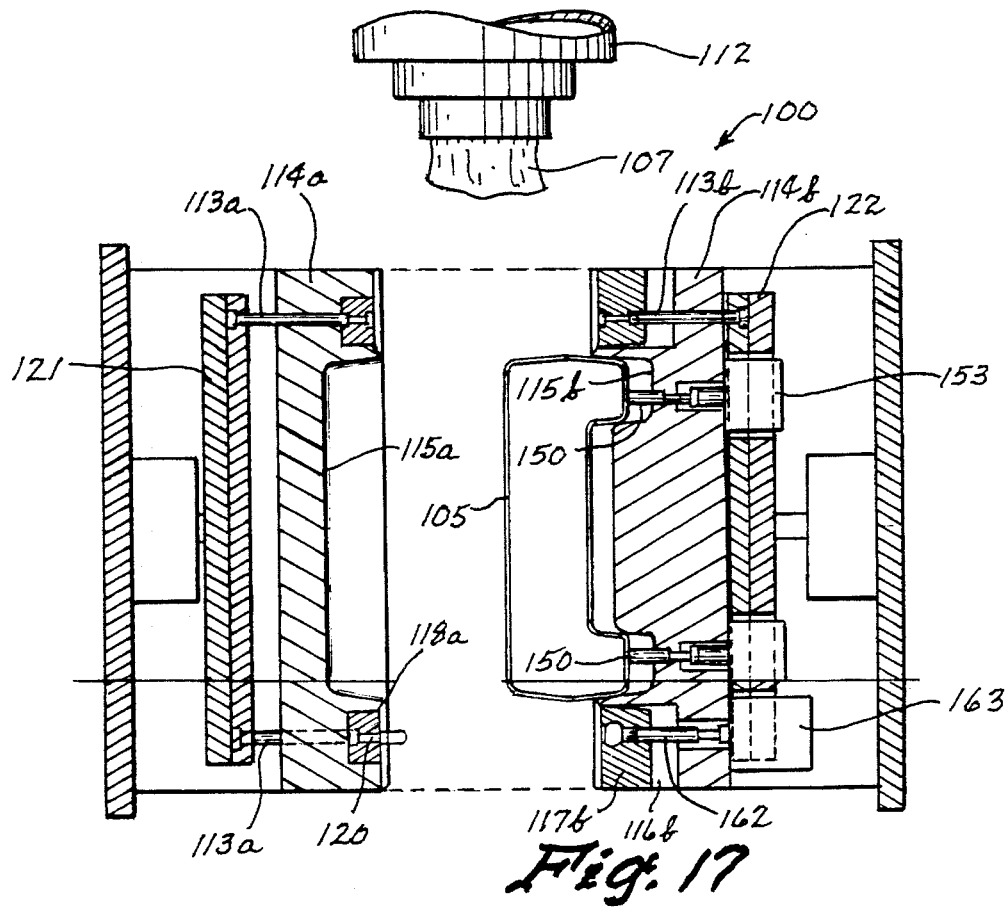
FIG. 17 is a view like FIG. 16 after the flash has been ejected and showing the plastic product being ejected from the mold.

The final step of the process is shown in FIG. 17 wherein pins 150 are moved from right to left so that pin 150 pushes the plastic product or part 105 out of the mold cavity 15b so that it can drop down onto a conveyor belt or the like to be removed.

Figure 18:
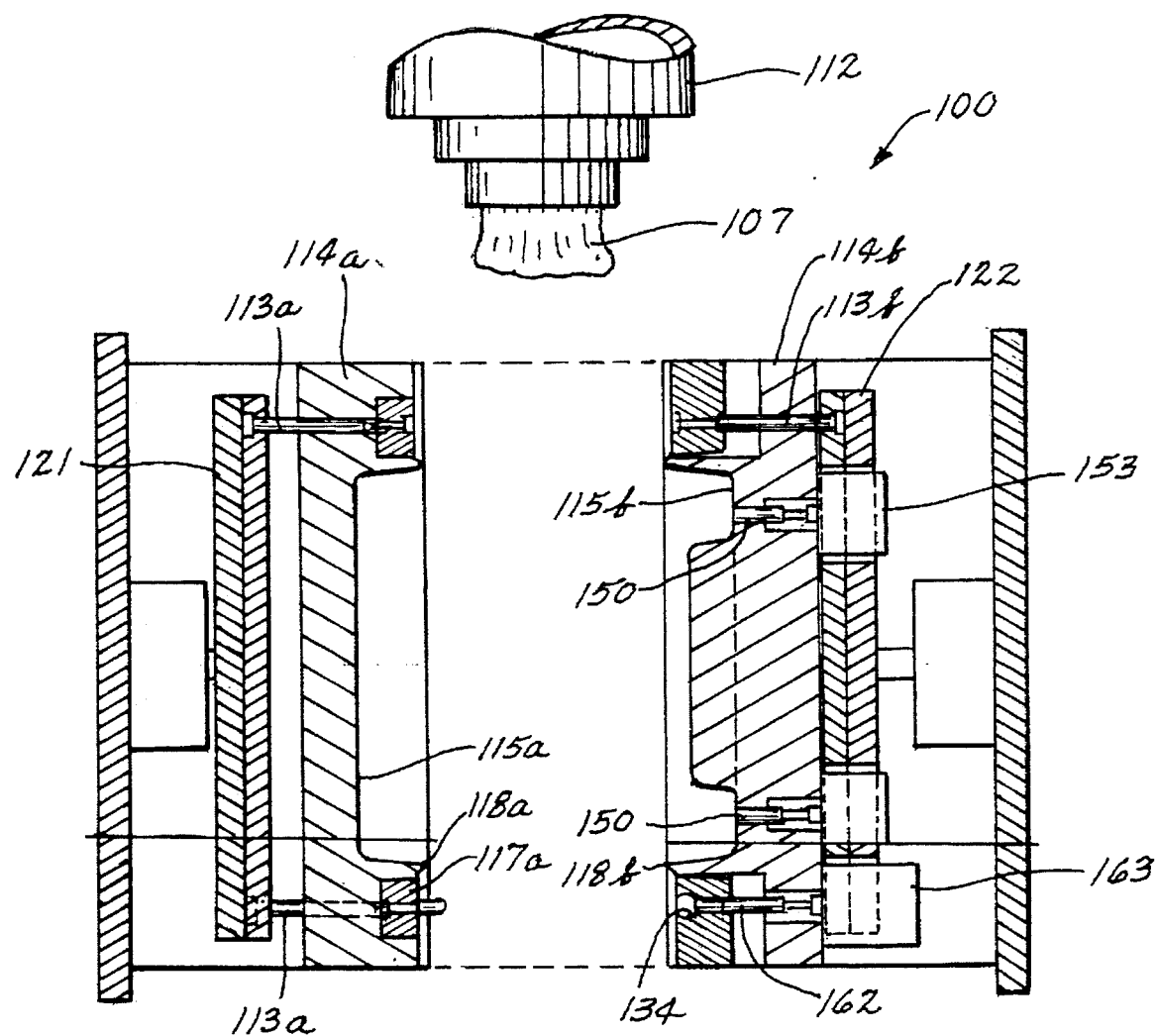
FIG. 18 is a view like FIG. 17 showing the part ejected and in readiness to receive another parison so the process can be repeated.

FIG. 18 shows the mold in its open position in readiness to receive another parison 107 just like the process began in FIG. 10.

Advantages of the embodiment of FIGS. 10–18 are that it can be installed in most new and existing molds; the flash and part are ejected at different times, allowing both to fall to a conveyor at different times; it can improve molding efficiencies by reducing the amount of labor required to mold parts; and it can allow molding machines to run automatically.

It is to be understood that while the foregoing has described the use of the present invention in a blow molding operation, its teaching are equally applicable to thermoforming, both twin sheet and pressure form, and it is intended that this specification cover these devices and methods as well.

Obviously, many modifications and variations of the present invention are possible in light of the above teachings. For example, many different configurations of the flash securement devices could be constructed. It is therefore to be understood that, within the scope of the appended claims, the invention may be practiced otherwise than as specifically described.

I claim:

1. Plastic blow molding apparatus comprising:

a first mold section having a first surface thereon;

a second mold section having a second surface movable along an axis between a first position in abutment with said first mold section and a second position spaced from said first mold section;

blow molding means for forming a mold cavity in at least one of said first and second mold sections to receive a plastic parison therein for blow molding into a desired hollow shape and wherein said first and second surfaces extend around the outer periphery of said cavity whereby a plastic product will be blow molded in said cavity and a plastic flash from said plastic parison will be formed between said first and second surfaces and substantially completely around said plastic product when said second mold section is in said first position thereof with respect to said first mold section;

securing means for operably holding said plastic flash to one of said mold sections when said plastic has solidified; and separating means for relatively moving said plastic product with respect to said plastic flash to cause said flash to separate from said product completely around the exterior periphery of said product.

2. The improved plastic molding apparatus as recited in claim 1 wherein said securing means comprises:

a flash retainer situated within one of said mold sections; and a flash pin, extendable to within said flash retainer.

3. The improved plastic molding apparatus as recited in claim 2 wherein said flash retainer and said flash pin are situated within one of said opposing mold sections and wherein said flash pin extends into said flash retainer when the mold sections are closed to the first position thereof.

4. The improved plastic molding apparatus as recited in claim 3 wherein said flash retainer comprises an inlet and a chamber, said inlet opening into said chamber and having a diameter smaller than said chamber.

5. The improved plastic molding apparatus as recited in claim 2 wherein said means for separating the plastic flash from the mold comprises a flash ejector rod disposed in one of said mold sections and extendable to within said flash retainer for forcing the flash from said flash retainer.

6. The improved plastic molding apparatus as recited in claim 1 further comprising means for separating the plastic product from said mold cavity.

7. The improved plastic molding apparatus as recited in claim 6 wherein said product separating means comprises a product ejector rod extendable through at least one of the mold sections.

8. The apparatus of claim 1 wherein said separating means comprises:

a first member in said first mold section and extending around said cavity, said first surface being disposed thereon;

a second member in said second mold section and extending around said cavity, said second surface being disposed thereon;

means for moving said first and second members to an initial position where the flash around the plastic product is formed directly radially outwardly from said plastic product between said first and second surfaces; and means for moving said first and second members with respect to said plastic product in a direction along said axis to a flash removal position whereby said plastic flash will be torn from said plastic product.

9. The improved plastic molding apparatus as recited in claim 8 wherein said securing means further comprises:

a flash retainer situated within said second member; and a flash pin, extendable to within said flash retainer.

10. The improved plastic molding apparatus as recited in claim 9 said second mold section wherein said flash pin extends into said flash retainer when the mold sections are closed to the first position thereof.

11. The improved plastic molding apparatus as recited in claim 10 wherein said flash retainer comprises an inlet and a chamber, said inlet opening into said chamber and having a diameter smaller than said chamber.

12. The improved plastic molding apparatus as recited in claim 9 wherein said means for separating the plastic flash from the mold further comprises a flash ejector rod disposed in said second member and extendable to within said flash retainer for forcing the flash from said flash retainer.

13. The improved plastic molding apparatus as recited in claim 8 further comprising means for separating the plastic product from said mold cavity.

14. The improved plastic molding apparatus as recited in claim 13 wherein said product separating means comprises a product ejector rod extendable through said second mold section.

15. In a method for molding plastic products wherein flash is formed when the plastic product is molded, the improvement comprising the steps of:

(a) placing a hollow plastic parison between a first and a second mold section;

(b) moving said first and second mold sections together to form a plastic product having flash disposed substantially completely around the periphery thereof;

(c) securing the plastic flash to one section of the mold;

(d) removing one of the plastic product and the flash from the mold sections while leaving the other in the mold sections whereby the flash is removed from the plastic product; and (e) removing the other one of the plastic product and the flash from the first and second mold sections whereby the mold sections are ready to receive a new plastic parison for forming another plastic product.

16. The improved method of molding plastic products as recited in claim wherein said step of securing the plastic flash to one of the mold sections comprises forcing the flash within a flash retainer situated within said one of the mold sections.

17. The improved method of molding plastic products as recited in claim 16 wherein said step of forcing the flash within a flash retainer comprises inserting a flash pin into the flash and into said flash retainer.

18. The improved method of molding plastic products as recited in claim 17 wherein said step of separating the plastic flash from the mold sections comprises forcing the flash from said flash retainer by use of a flash ejector rod.

19. The improved method of molding plastic products are recited in claim 15 wherein said step of separating the plastic product from the mold sections comprises forcing the product from the mold by use of a product ejector rod.

* * * * *